US012780593B2

(12) United States Patent
Casotti et al.

(10) Patent No.: US 12,780,593 B2
(45) Date of Patent: Nov. 3, 2026

(54) INTERFOLDING MACHINE AND METHOD FOR VARYING A LENGTH OF SHEET ARTICLES PRODUCED BY THE INTERFOLDING MACHINE

(71) Applicant: OT LUCCA S.R.L., Montecarlo (IT)

(72) Inventors: Paolo Casotti, Lucca-Fraz.Antraccoli (IT); Nicolò Giannoni, Capannori (IT)

(73) Assignee: OT LUCCA S.R.L., Montecarlo (IT)

( * ) Notice: Subject to any disclaimer, the term of this patent is extended or adjusted under 35 U.S.C. 154(b) by 0 days.

(21) Appl. No.: 18/995,801

(22) PCT Filed: Aug. 1, 2023

(86) PCT No.: PCT/IB2023/057775

§ 371 (c)(1),
(2) Date: Jan. 16, 2025

(87) PCT Pub. No.: WO2024/028757

PCT Pub. Date: Feb. 8, 2024

(65) Prior Publication Data

US 2026/0042633 A1 Feb. 12, 2026

(30) Foreign Application Priority Data

Aug. 5, 2022 (IT) ........................ 102022000016767

(51) Int. Cl.

*B65H 45/28* (2006.01)
*B26D 1/38* (2006.01)
*B65H 45/24* (2006.01)

(52) U.S. Cl.

CPC ............ *B65H 45/28* (2013.01); *B26D 1/385* (2013.01); *B65H 45/24* (2013.01)

(58) Field of Classification Search

CPC ........ B65H 35/00; B65H 45/12; B65H 45/28; B65H 45/24; B26D 1/385

See application file for complete search history.

(56) References Cited

U.S. PATENT DOCUMENTS 4,070,014 A * 1/1978 Takahashi ............. B65H 45/24 493/413
4,494,741 A 1/1985 Fischer et al.

(Continued)

FOREIGN PATENT DOCUMENTS

| | | |
|---|---|---|
| EP | 1837137 | 9/2007 |
| EP | 2437994 | 8/2013 |

(Continued)

OTHER PUBLICATIONS

"International Search Report (Form PCT/ISA/210) of PCT/IB2023/057775", mailed on Dec. 5, 2023, pp. 1-5.

(Continued)

*Primary Examiner* — Andrew M Tecco
*Assistant Examiner* — Nicholas E Igbokwe
(74) *Attorney, Agent, or Firm* — JCIPRNET

(57) ABSTRACT

An interfolding machine comprising a first roller unit which comprises a cutting tool and a first roller for guiding a strip, a frame housing the first roller unit and a beam bearing a first cutting tool and fixed to the frame in a first position in which the first cutting tool has a relative first position with respect to the rotation axis of the first roller that is such as to cut or score the strip with the cutting tool of the first roller unit. The beam bears a second cutting tool and is fixable to the frame in a second position in which the second cutting tool has a relative second position with respect to the rotation axis so as to cut or score with the cutting tool of another roller unit.

14 Claims, 9 Drawing Sheets

(56) References Cited

U.S. PATENT DOCUMENTS

| | | | | |
|---|---|---|---|---|
| 2005/0082332 | A1* | 4/2005 | White | B65H 45/24 226/95 |
| 2006/0052228 | A1* | 3/2006 | De Matteis | B65H 45/24 493/360 |
| 2007/0082800 | A1* | 4/2007 | Kauppila | B65H 45/162 493/427 |
| 2007/0203007 | A1* | 8/2007 | De Matteis | B65H 29/6618 493/360 |
| 2011/0154782 | A1* | 6/2011 | Walsh | B65H 45/20 53/429 |
| 2011/0158782 | A1* | 6/2011 | Walsh | B65H 45/24 414/790.1 |
| 2015/0360901 | A1* | 12/2015 | Butterworth | B65H 45/162 493/360 |
| 2017/0152123 | A9* | 6/2017 | Butterworth | B65H 45/162 |
| 2021/0252728 | A1* | 8/2021 | Montagnani | B26D 1/405 |

FOREIGN PATENT DOCUMENTS

| | | |
|---|---|---|
| WO | 0006351 | 2/2000 |
| WO | 2019239283 | 12/2019 |
| WO | 2020110020 | 6/2020 |

OTHER PUBLICATIONS

"Written Opinion of the International Searching Authority (Form PCT/ISA/237) of PCT/IB2023/057775", mailed on Dec. 5, 2023, pp. 1-4.

* cited by examiner

INTERFOLDING MACHINE AND METHOD FOR VARYING A LENGTH OF SHEET ARTICLES PRODUCED BY THE INTERFOLDING MACHINE

CROSS-REFERENCE TO RELATED APPLICATION

This application is a 371 application of the International PCT application serial no. PCT/IB2023/057775, filed on Aug. 1, 2023, which claims the priority benefits of Italy Patent Application No. 102022000016767, filed on Aug. 5, 2022. Each of the entirety of the above-mentioned patent applications is hereby incorporated by reference herein and made a part of this specification.

FIELD OF THE INVENTION

The present invention relates to the technical sector regarding the production of interfolded packs of sheet articles. In this technical sector, interfolding machines are normally used that ensure the formation of interfolded packs of sheet articles obtained by cutting or perforating continuous strips, usually originating from the unwinding of reels. In greater detail, the present invention concerns a machine, a system and a method which enable obtaining different lengths of sheet articles, a characteristic commonly known as cut-off.

DESCRIPTION OF THE PRIOR ART

The advantages are known of the use of interfolded packs produced with interfolding machines such as, for example, the ones described in U.S. Pat. No. 4,494,741A or in EP 2437994 B1. In like interfolding machines, for example with reference to FIG. 1 of EP 2437994 B1, during the unwinding and folding of the strips, cuts or lines or pre-cut perforations or tear lines are realised so as to produce sheet articles. These are moved by a roller, termed a folding roller, and folded by folding fingers which collect them from the folding roller and interpose them with the sheet articles coming from the opposite side and folded by other folding elements. Generally the interfolding machines comprise an interfolding unit which comprises folding rollers, cutting rollers and folding elements or cutting and folding rollers and folding elements, with the rollers arranged opposite one another so as to operate on distinct strips from which the sheet articles are obtained, which are interfolded. The cutting rollers, or cutting and folding rollers, usually cooperate with blades or counter-blades fixed and arranged in proximity of the cutting rollers and borne by beams fixed to the frame. Typically the folding roller, or cutting and folding roller, is provided with recesses and channels in which a depression is formed, so as to attract the sheet articles and take them into the area where the stack is formed. The folding elements enter and exit from gullies made on the folding roller, detaching the sheet articles and creating the fold.

The diameter of the rollers is determined by the desired length of the sheet articles; typically the circumference of the rollers must be a multiple of the desired length. It is therefore necessary to change the rollers each time it is required to work with a different length of the sheet articles. Consequently also the blades and counter-blades must be adapted to the new size and/or conformation of the rollers. The beam fixed to the frame must therefore be dismounted and a new beam fixed in an operation requiring time as well as the intervention of a technical expert, as well as necessitating the storing of the beams which are replaced with the risk of damage to them during transport.

The present invention intends to obviate one or more drawbacks of the solutions of the prior art.

SUMMARY OF THE INVENTION

A first aim of the present invention is to simplify the reconfiguration of an interfolding machine when it is necessary to modify production, i.e. change the length of the articles in sheet form (cut-off).

A second aim is to reduce the risks of wrong positionings and/or damage to the fixed blades or counter-blades deriving from the replacement of the beam. A still further aim, especially of some embodiments, is to provide a system or an interfolding machine in which the replacement of the rollers is especially easy and rapid.

A further aim is to allow exploitation of the teachings of the invention in existing systems.

These and other aims, which will become clearer to the expert from a reading of the text that follows are attained by means of an interfolding machine for production of interfolded packs of sheet articles from strips, of a system and method for varying the length of the sheet articles of the interfolded packs of sheet articles produced by an interfolding machine according to the claims.

In accordance with the teachings of the present document, the interfolding machine comprises a first roller unit, a frame, movement means, a first cutting tool and a beam.

The first roller unit comprises a cutting tool and a first roller, for guiding a strip, which bears the cutting tool.

The frame comprises a seat which houses the first roller unit.

The movement means move the first roller in rotation with respect to the frame about a rotation axis.

The beam bears the first cutting tool and is fixed to the frame in a first position in which the first cutting tool has a relative first position with respect to the rotation axis so as to cut or score the strip with the cutting tool of the first roller unit.

The first roller unit is interchangeable with another roller unit so as to vary the distance between the cuts or scores on the strip and therefore the length of the sheet articles.

The interfolding machine advantageously also comprises a second cutting tool; the beam brings the second cutting tool into a different position with respect to the first cutting tool and is fixable to the frame in a second position in which the second cutting tool has a relative second position with respect to the rotation axis, different the relative first position, so as to cut or score the strip with the cutting tool of the other roller unit.

The system comprises an interfolding machine as illustrated in this description and another roller unit which comprises a dedicated cutting tool and another roller, for guiding a strip, which bears a dedicated cutting tool.

The first roller is configured to rotate about a first axis and brings the dedicated cutting tool to a first distance from the first axis while the other roller is configured to rotate about a second axis and brings the dedicated cutting tool to a second distance from the second axis, different to the first distance.

The method comprises steps of:

providing a system as illustrated in the present text;

removing the beam from the first position;

removing the first roller unit from the seat;

positioning the other roller unit in the seat;

fixing the beam to the frame in the second position.

BRIEF DESCRIPTION OF THE DRAWINGS

Specific embodiments of the invention will be described in the following part of the present description, according to what is set down in the claims and with the aid of the accompanying tables of drawings, in which:

DESCRIPTION OF THE PREFERRED EMBODIMENTS

Figure 1:
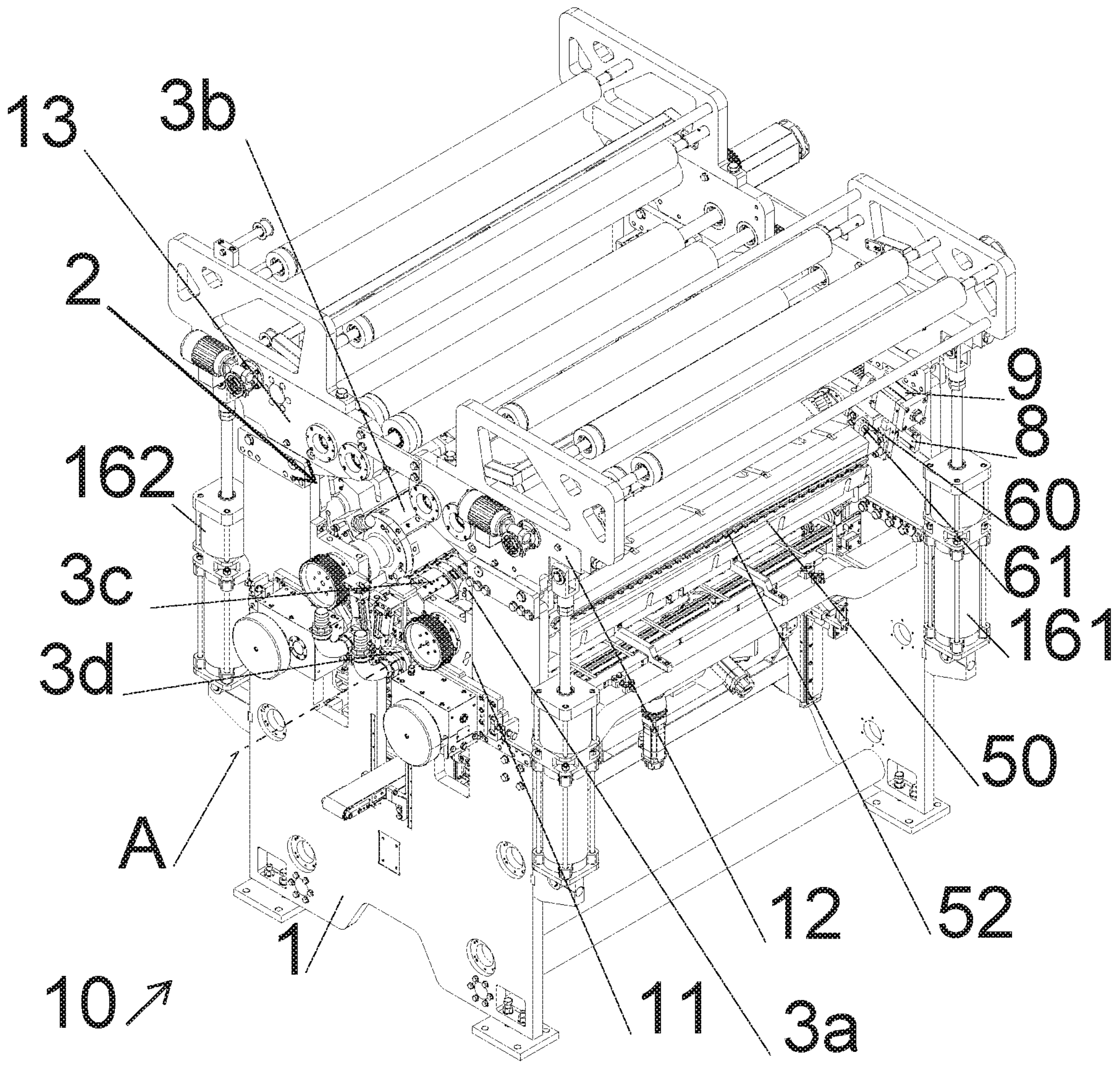
FIG. 1 is an axonometric view of a portion of an embodiment of an interfolding machine according to the invention.

With reference to the appended figures, reference numeral (10) denotes an interfolding machine for production of interfolded packs of sheet articles from strips. The references are included to facilitate understanding of the invention but are not intended to limit the scope of protection thereof.

An embodiment of the interfolding machine (10) comprises:

- a first roller unit (3*a*) which comprises a cutting tool (30*a*) and a first roller (33*a*), for guiding a strip, which bears the cutting tool (30*a*);
- a frame (1) which comprises a seat (11) which houses the first roller unit (3*a*);
- movement means (4) which move the first roller (33*a*) in rotation with respect to the frame (1) about a rotation axis (A);
- a first cutting tool (51);
- a second cutting tool (52);
- a beam (50) which bears the first cutting tool (51) and which is fixed to the frame (1) in a first position in which the first cutting tool (51) has a relative first position with respect to the rotation axis (A) such as to cut or score the strip with the cutting tool (30*a*) of the first roller unit (3*a*).

In the interfolding machine (10) according to the invention, the first roller unit (3*a*) is interchangeable with another roller unit (7*a*) so as to vary the distance between the cuts or scores on the strip and therefore the length of the sheet articles.

The beam (50) advantageously brings the second cutting tool (52) into a different position with respect to the first cutting tool (51) and is fixable to the frame (1) in a second position in which the second cutting tool (52) has a relative second position with respect to the rotation axis (A), different to the relative first position, so as to cut or score the strip with the cutting tool (70*a*) of the other roller unit (7*a*). An interfolding machine (10) according to the invention enables a rapid change of the cut-off, so as to vary a length of articles in sheet form, determined by the cuts or scores realised by the cooperation of the first cutting tool (51) with the first roller unit (3*a*) or of the second cutting tool (52) with the other roller unit (7*a*). Further, this change does not require the distancing of the beam (50) from the interfolding machine with the risk of damage, and preventing wrong positionings of the beam (50) which might have a negative effect on the quality of the interfolded packs.

The beam (50) is preferably rotatable with respect to the frame (1) about an axis (X) so that the first cutting tool (51) and the second cutting tool (52) are orientable with respect to the axis (X) respectively as in the relative first position and as in the relative second position.

Figure 4:
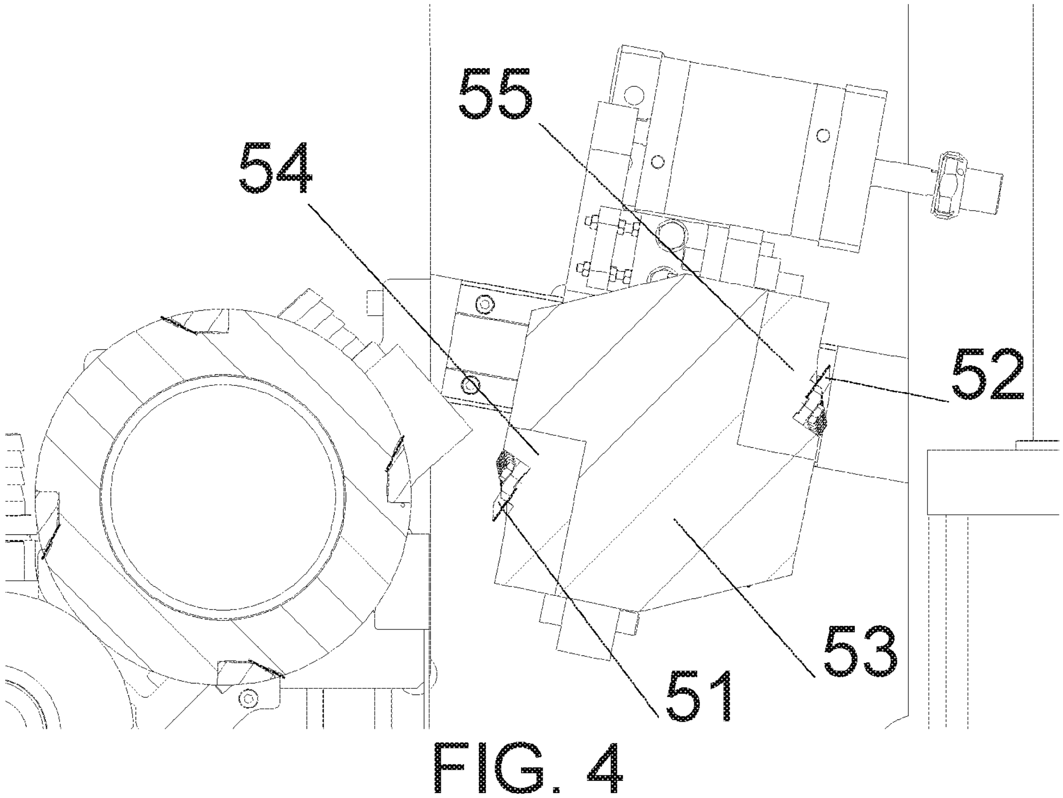
Figure 5:
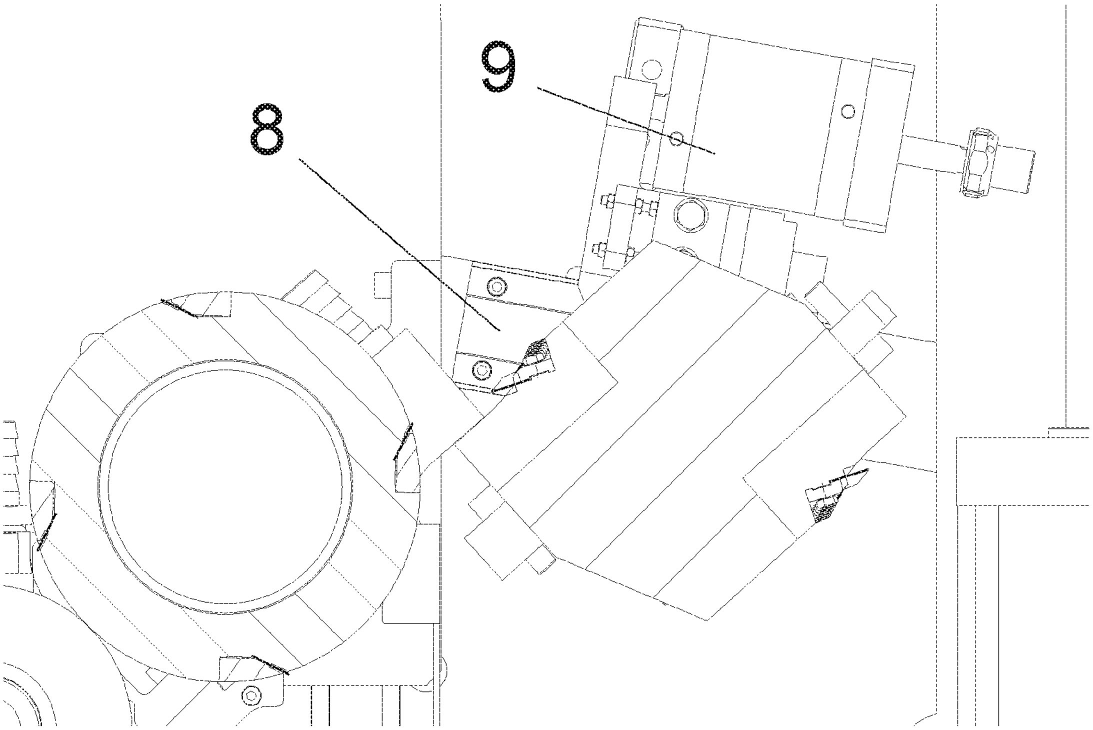
Figure 6:
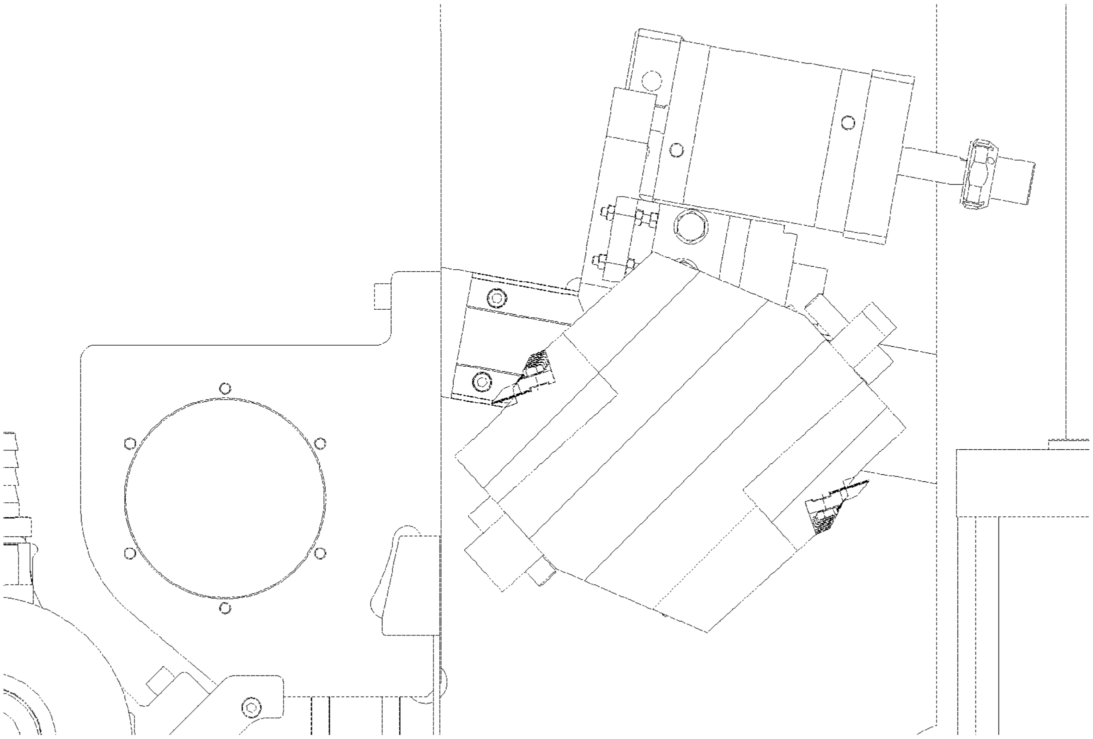
Figure 7:
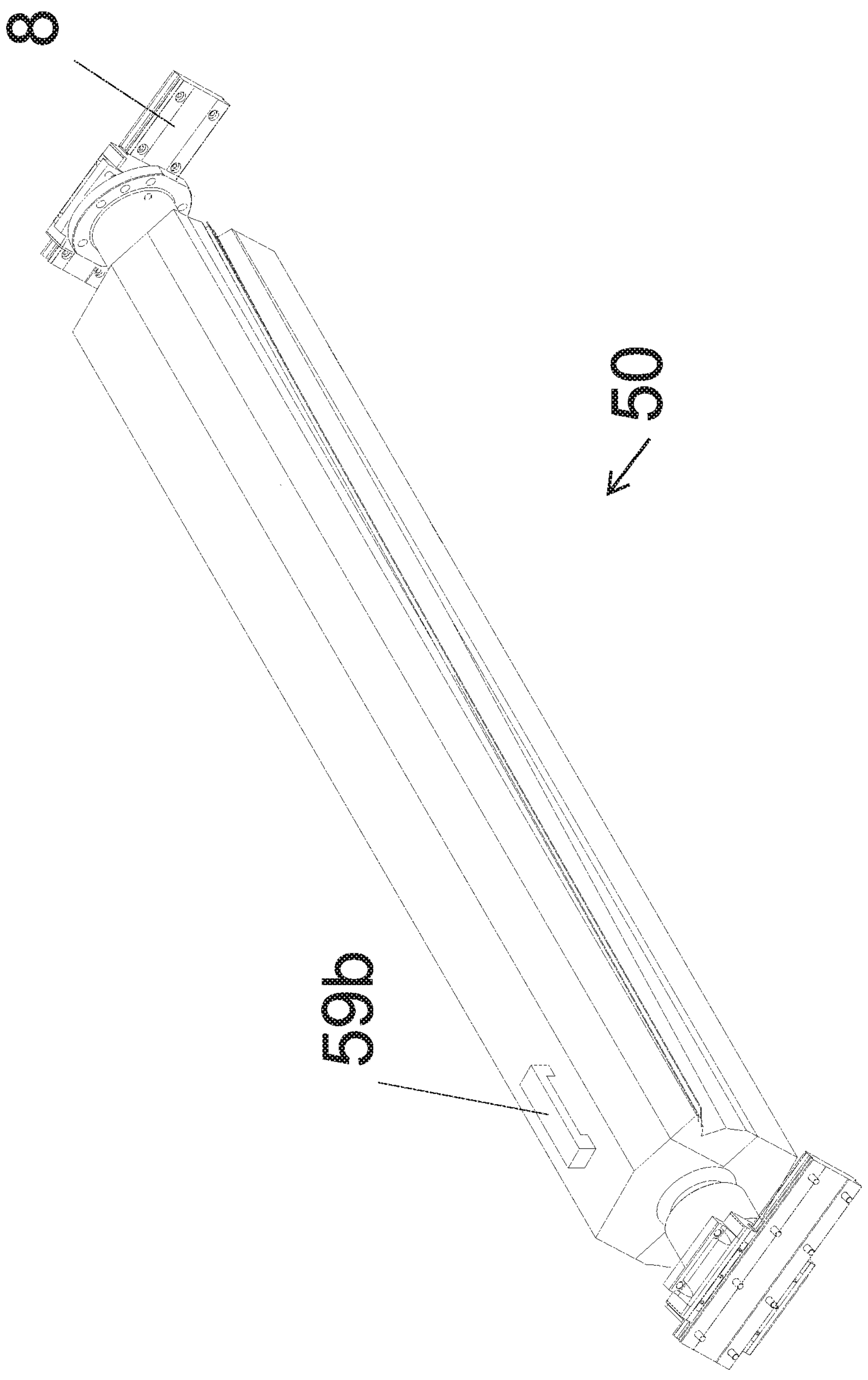
FIG. 7 is an axonometric view of a portion of the interfolding machine of FIG. 1.

It is thus possible to easily move the beam (50) into the first position or the second position, for example using a handle (59*b*) like the one illustrated in FIG. 7. For example, FIG. 5 shows a small rotation with respect to FIG. 4 and FIG. 6 shows the removal of the first roller unit (3*a*).

The expert in the sector will understand how the first cutting tool (51) and the second cutting tool (52) must be appropriately arranged so as to be in the relative suitable position that is downstream of the rotation of the beam (50).

The first cutting tool (51) and the second cutting tool (52) are preferably directed in opposite directions to one another with respect to the beam (50); in this way it is easier to replace the first cutting tool (51) or the second cutting tool (52).

Notwithstanding this, the first cutting tool (51) and the second cutting tool (52) might be on adjacent sides, for example one facing laterally and the other superiorly.

The first cutting tool (51) and the second cutting tool (52) preferably both comprise a blade, or counter-blade. The beam (50) comprises a first support part (54*a*) which houses the blade of the first cutting tool (51) and a second support part which houses the blade of the second cutting tool (52). The first support part (54*a*) and the second support part are configured so as to adapt the blades to the cutting tool (30*a*, 70*a*) respectively of the first roller unit (3*a*) or the other roller unit (7*a*).

It is therefore possible to arrange blades, or counter-blades, that are standard, and to adapt the first support part (54*a*) or the second support part to the specific application. In the drawings, the second support part is not visible in the extension thereof but it is substantially alike to the first support part (54*a*). Indeed, it is possible to use blades, or counter-blades, that are identical to one another for the first cutting tool (51) and the second cutting tool (52).

More preferably, both the first support part (54*a*) and the second support part have a helical development and the first cutting tool (51) and the second cutting tool (52) comprise blades, or counter-blades, fixed resting on the respective support part (54*a*) so as to follow the helical development; the blades, or counter-blades, are preferably identical to one another. The helical development enables improving the interaction between the cutting tools, due to an effect alike to that of a pair of scissors. For example the first cutting tool (51) progressively cooperates with the cutting tool (30*a*) so as to cut the strip in points, or areas, successive in the direction of the rotation axis (A).

Figure 10:
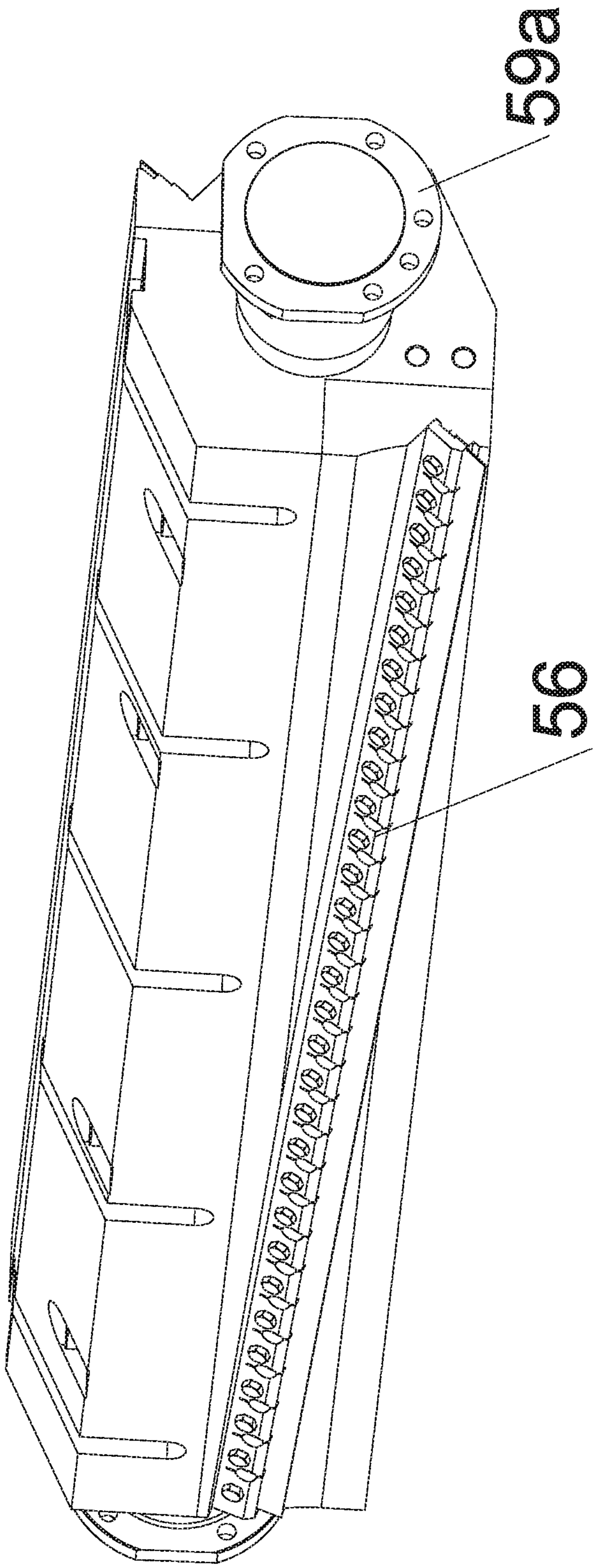
FIG. 10 is an axonometric view of a beam of the interfolding machine of FIG. 1.

The first cutting tool (51) and/or the second cutting tool (52) are preferably maintained in position respectively by a first stop (56) or by a second stop (57). FIG. 10 shows how the first stop (56), owing to the screws, forces the blade to follow the helical development of the first support part (54*a*).

The beam (50) preferably comprises a central part (53), a first support (54) which supports the first cutting tool (51) and a second support (55) which supports the second cutting tool (52). The first support (54) and the second support (55) are removably fixed to the central part (53).

Figure 11:
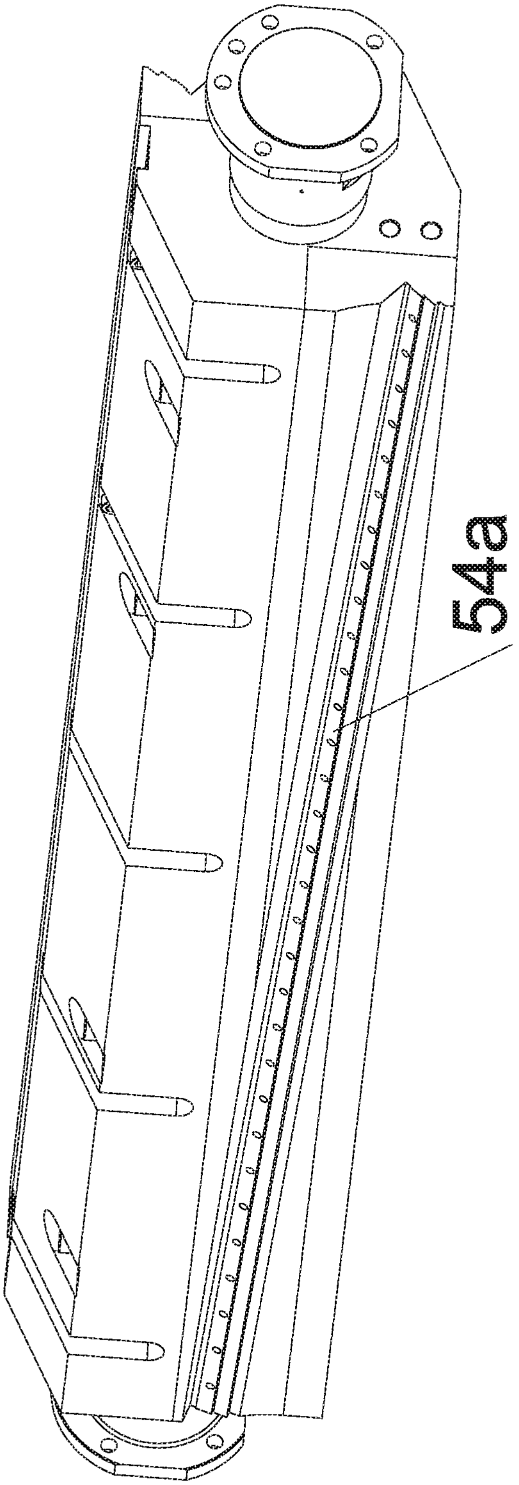
FIG. 11 is the axonometric view of FIG. 10 but without the blade and blade stop.

The beam (50) is easily and rapidly adaptable to the specific application. Possibly, as in the embodiment of FIG. 11, the first support part (54*a*) comprises a first support part (54*a*) and the second support (55) comprises and a second support part as described above.

The beam (50) is preferably translatable with respect to the frame (1) in moving towards or away from the rotation axis (A) between a working position in which the first cutting tool (51) cooperates with the cutting tool (30*a*) of the first roller unit (3*a*) and a rest position in which the first cutting tool (51) is by a side of the first roller (33*a*) so as to enable the change with the other roller unit (7*a*).

It is thus possible to further facilitate the cut-off change, as well as the possible rotation of the beam (50) about the axis (X). As can be observed, by way of example, in FIGS. 3 to 6: the first cutting tool (51) is first moved away from the first roller (33*a*) so as to enable the change with the other roller unit (73*a*) and the beam (50) is rotated so as to bring the second cutting tool (52) towards the rotation axis (A).

In the figures, as well as in FIG. 1, it can be observed that, preferably, the interfolding machine (10) comprises a linear guide (8) which enables translation of the beam (50) with respect to the frame (1). More preferably, as in the illustrated embodiment, a hydraulic or pneumatic cylinder (9) moves the beam (50) with respect to the frame (1) along the linear guide (8).

The rotation can take place manually or, possibly, it can be automated with the use of, for example, a step motor.

Figure 14:
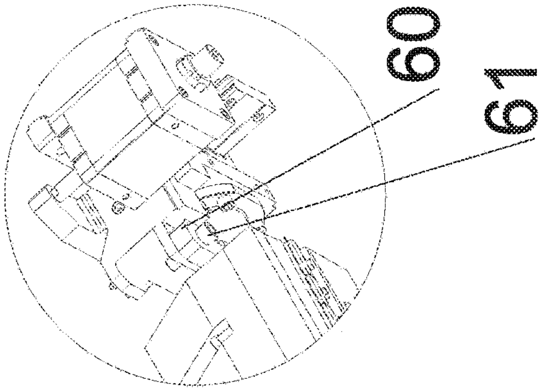
FIG. 14 shows some particulars in detail of the embodiment di FIG. 1.

The interfolding machine (10) preferably comprises blocking means which maintain the beam (50) in working position. By way of example, in FIG. 1 and in the relative detail shown in FIG. 14, a block (60) can be observed which makes the support (59*a*) and a central part (53) of the beam (50) reciprocally solidly constrained, by use of one or more screws (61), or pins, so as to prevent rotation thereof about the axis (X).

Figure 8:
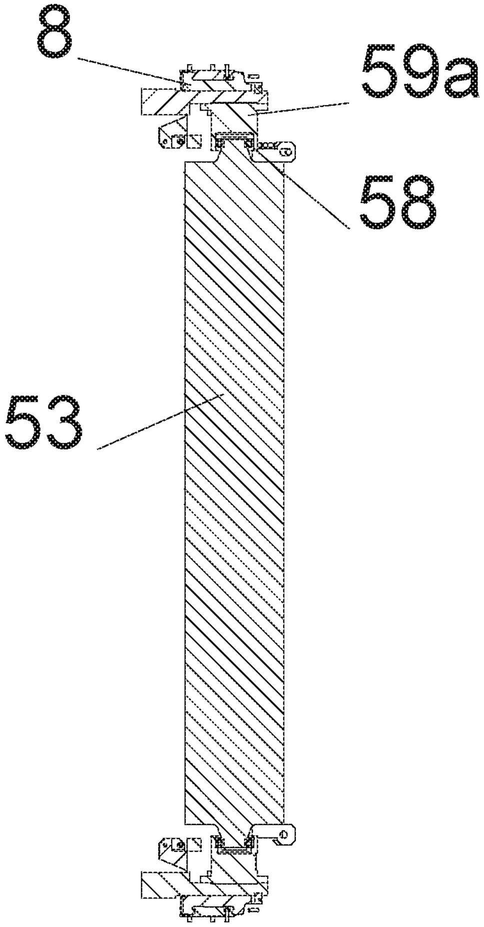
FIG. 8 is a section of a portion of the interfolding machine of FIG. 1.

The rotation of the beam (50) can be guaranteed by roller bearings or sliding bearings, for example in FIG. 8 two roller bearings (58) can be seen, which enable the central part (53) to rotate with respect to supports (59*a*) coupled to the linear guide (8).

FIG. 1 shows an embodiment of an interfolding machine (10) according to the invention with an interfolding unit (2) which comprises roller units (3*a*, 3*b*, 3*c*, 3*d*) that form a first set, and cutting beams (50). The rollers of the third roller unit (3*c*) and of the fourth roller unit (3*d*) are configured for moving sheet articles, and cooperate with the folding elements (not visible) to arrange the sheet articles in an interfolded way.

Figure 9:
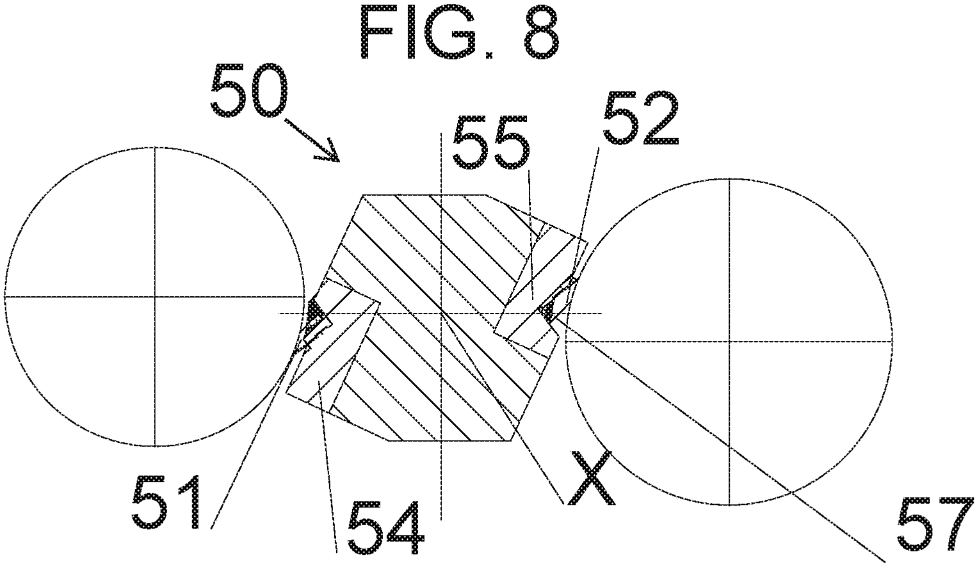
FIG. 9 schematically shows the cooperation between the fixed cutting tools and those set in rotation by the rollers.
Figure 12:
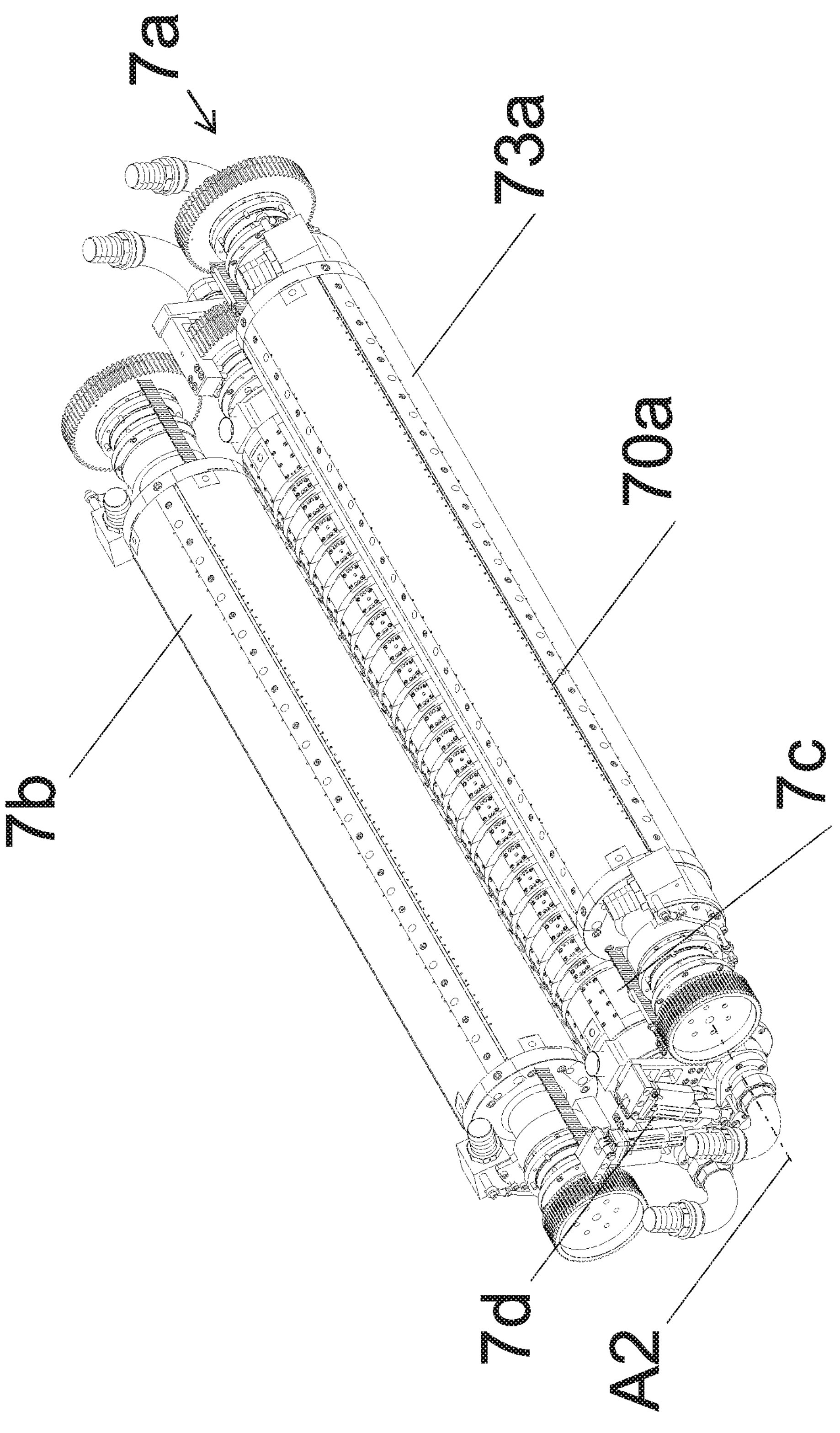
FIG. 12 is an axonometric view of another set of roller units of an embodiment of the system according to the invention.

FIG. 12 illustrates another set of roller units (7*a*, 7*b*, 7*c*, 7*d*) which is interchangeable, in the interfolding machine (10), with the first set. The rollers of the other set differ from the rollers of the first set such as to determine and operate a different length of the sheet articles. Generally there are at least small variations in the diameter of the rollers. It is specified that in the accompanying figures it is not possible to observe the dimensional variations between the set and the second set as the diameters vary by small amounts. To evidence the usefulness of the teachings of the invention FIG. 9 schematically illustrates a beam (50) which operates with two roller diameters, significantly differing from one another, with dimensional differences that it would be difficult to have in reality.

Generally the first roller (33*a*) for guiding a strip bears a blade facing radially towards the outside so that the blade has a circular trajectory with respect to a plane that is perpendicular to the rotation axis (A). The beam (50) is then positioned in such a way that the first cutting tool (51) can cooperate with the blade of the first roller (33*a*). The precise relative position of the first cutting tool (51) with respect to the rotation axis (A) results at least in a distance, linked to the radius of the circular trajectory, and often in an extension or curvature of the blade or counter-blade, typically helical.

Similar considerations can be applied to the second cutting tool (52).

The movement means (4) comprise at least a main motor and, in general, drive transmission means. The movement means (4) are visible, by way of example, in FIG. 13: each of the roller units (3*a*, 3*b*, 3*c*, 3*d*, 7*a*, 7*b*, 7*c*, 7*d*) comprises a gear ((34*a*), in the case of the first roller unit (3*a*)) for receiving the drive from a main motor, usually via transmission means which can comprise belts and/or cogged wheels.

The interfolding machine (10) is preferably configured in such a way as to enable lifting the roller units (3*a*, 3*b*, 3*c*, 3*d*) of the first set together, and generally also the roller units (7*a*, 7*b*, 7*c*, 7*d*) of the second set. It is usually preferable for the frame (1) to have a U-shaped configuration at the seats of the roller units, with the seats opening upwards, towards the open part of the U.

Generally, as illustrated in FIG. 1, the frame (1) comprises a seat (11) for each roller unit (3*a*, 3*b*, 3*c*, 3*d*) of the first set which removably houses the roller (33*a*), and also for the rollers (73*a*) of the second set.

Commonly, through not necessarily, the interfolding machine (10) comprises idler rollers and/or drive rollers at a greater height than that of the interfolding unit (2); with the aim of enabling the lifting, the components can advantageously be arranged at a greater height or it is possible to make at least a part of the interfolding machine (10) movable.

The frame (1) preferably comprises a first upper part (12) which bears idler rollers and/or drive rollers, a second upper part (13) which bears idler rollers and/or drive rollers and a lower part which has the seats. The first upper part (12) and the second upper part (13) are both movable with respect to the lower part so as to free the space above the roller units (3*a*, 3*b*, 3*c*, 3*d*) necessary to enable the lifting thereof.

More preferably, as can be observed in FIG. 1, the first upper part (12) and the second upper part (13) are both hinged to the lower part (11) and the interfolding machine (10) comprises at least an actuator (161, 162) which moves the first upper part (12) and the second upper part (13) between a first operating position and a second maintenance position in which the first upper part (12) and the second upper part (13) free the space above the roller units (3*a*, 3*b*, 3*c*, 3*d*) of the first set so as to enable the lifting thereof. The lateral volume of the interfolding machine (10) in this way increases in a limited way, or does not increase.

In a preferred embodiment at least an actuator (161, 162) comprises a first hydraulic or pneumatic cylinder (161)

which is connected to the first upper part (12) and to the lower part so as to move the first upper part (12) and a second hydraulic or pneumatic cylinder (162) which is connected to the second upper part (13) and to the lower part (13).

In a common embodiment, each of the cutting tools (30*a*, 70*a*), of the first cutting tool (51) and the second cutting tool (52) comprises a blade or a counter-blade so as to cooperate with a respective counter-blade or blade, as shown by way of example in the figures. The blades or counter-blades of the first cutting tool (51) and the second cutting tool (52) can be mutually interchangeable, i.e. can be the same replacement part.

In the appended drawings, blades and counter-blades can be seen, which cooperate with one another and extend over the whole cutting length in the direction of the rotation axis (A); however each of the cutting tools (30*a*, 70*a*), of the first cutting tool (51) and the second cutting tool (52) can comprise a plurality of blades or counter-blades, in the direction of the rotation axis (A).

Typically the rollers, for example the first roller (33*a*) and the other roller (73*a*), comprise suction means for guiding a strip.

Figure 2:
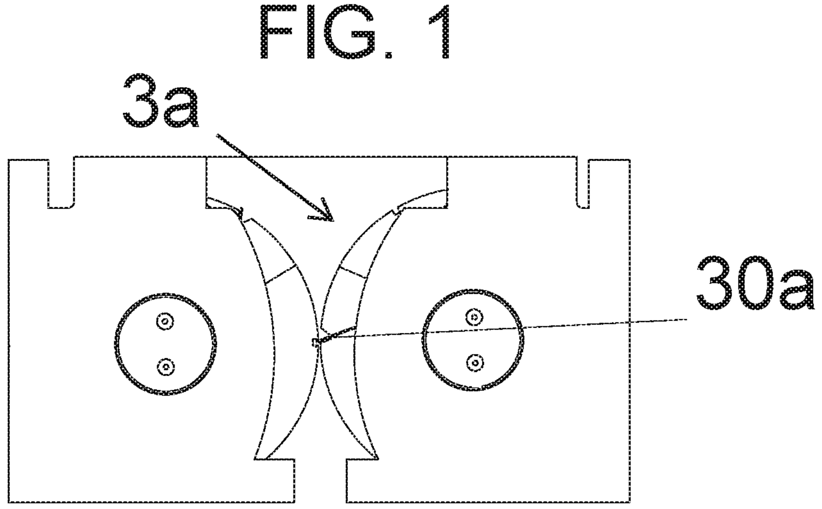
FIG. 2 is a lateral view of a portion of an interfolding machine according to an embodiment that is different to the view of FIG. 1.
Figure 3:
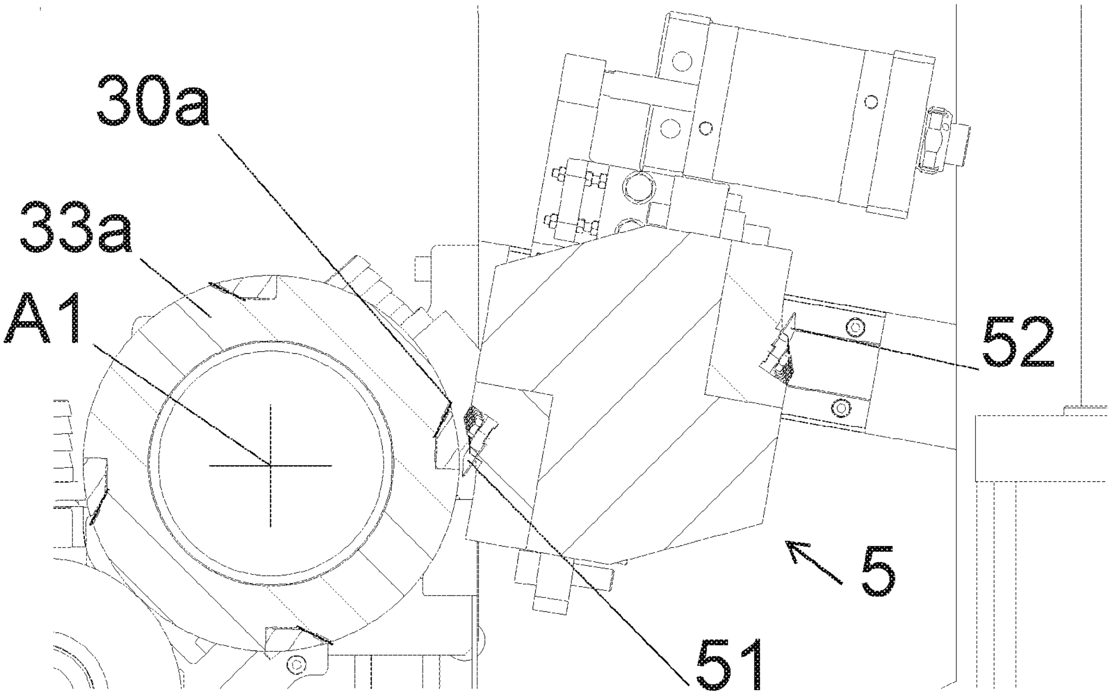
FIGS. 3 to 6 illustrate, in section views, a sequence of movement of the fixed cutting tools of the interfolding machine of FIG. 1.

The interfolding unit (2) can comprise folding rollers and cutting rollers or cutting and folding rollers, as shown respectively in FIG. 1 and FIG. 2. Clearly the teachings of the present text are advantageously applicable in both versions.

Figure 13:
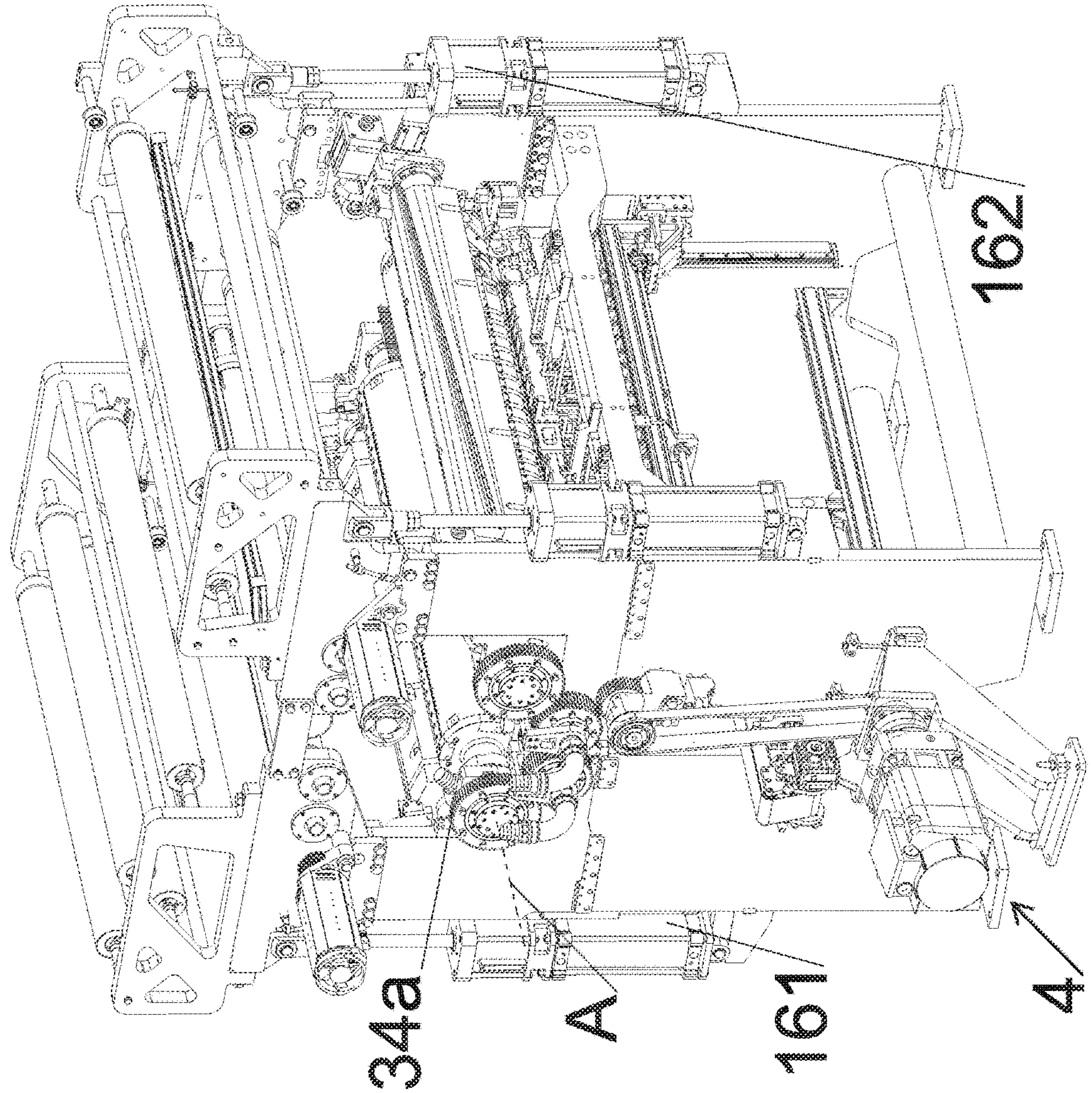
FIG. 13 is an axonometric view of the embodiment of FIG. 1 from the opposite side with respect to FIG. 1.

It is also clear to the expert in the sector that the teachings of the text are preferably applied on both sides of the interfolding unit (2), i.e. also to the other beam visible in FIG. 1 and FIG. 13.

The invention also relates to a system. An embodiment of the system comprises an interfolding machine (10) according to the present description and another roller unit (7*a*) which comprises a dedicated cutting tool (70*a*) and another roller (73*a*), for guiding a strip, which bears a dedicated cutting tool (70*a*).

The first roller (33*a*) is configured to rotate about a first axis (A1), which in the figures coincides with the rotation axis (A), and brings the dedicated cutting tool (30*a*) to a first distance from the first axis (A1) and wherein the other roller (73*a*) is configured to rotate about a second axis (A2) and brings the dedicated cutting tool (70*a*) to a second distance from the second axis (A2), different to the first distance. The system thus enables obtaining the above-illustrated advantages. Clearly the distances, in order to be comparable, must make reference to corresponding points of the first cutting tool (30*a*) and the second cutting tool (70*a*).

The invention also relates to a method for varying the length of the sheet articles of the interfolded packs of sheet articles produced by an interfolding machine (10). An embodiment of the method comprises steps of:

- providing a system according to the present description;
- removing the beam (50) from the first position;
- removing the first roller unit (3*a*) from the seat (11);
- positioning the other roller unit (7*a*) in the seat (11);
- fixing the beam (50) to the frame (1) in the second position.

The method enables rapidly changing the cut-off, giving the further advantages already mentioned in the foregoing, including in relation to the above-described preferred embodiments.

As illustrated in the foregoing, FIGS. 3 to 6 enable a appreciation of the first steps of one of the embodiments of the method.

In the step of providing a system, a beam is preferably provided (50) which is rotatable with respect to the frame (1) about an axis (X) so that the first cutting tool (51) and the second cutting tool (52) are orientable with respect to the axis (X) respectively as in the relative first position and as in the relative second position. The beam (50) is translatable with respect to the frame (1) in moving towards or away from the rotation axis (A) between a working position (see FIG. 3) in which the first cutting tool (51) is in the relative first position with respect to a rest position (see FIG. 4) in which the first cutting tool (51) is by a side of the first roller (33*a*) so as to enable the change with the other roller unit (70*a*). Further, in the timing di removing the beam (50) from the first position, the beam (50) is moved to the rest position and the step of removing the first roller unit (3*a*) from the seat (11) takes place after the beam (50) is in the rest position.

More preferably, in the step of fixing the beam (50) to the frame (1) in the second position the beam (50) is rotated about the axis (X) up to orientating the second cutting tool (52) with respect to the axis (X) as in the relative second position.

The method enables a precise movement of the beam (50) so as to rapidly, and with certainty, identify, the first position and the second position.

In the step of providing a system, a frame (1) is preferably provided comprising a first upper part (12) which bears idler rollers and/or drive rollers, a second upper part (13) which bears idler rollers and/or drive rollers and a lower part which has the seat (11), with the first upper part (12) and the second upper part (13) both being movable with respect to the lower part so as to free a space above the roller units (3*a*, 3*b*, 3*c*, 3*d*) sufficient to enable the lifting thereof. Further, in the step of removing the first roller unit (3*a*) from the seat (11) the first upper part (12) and/or the second upper part (13) are both moved with respect to the lower part.

It is understood that the above has been described by way of non-limiting example and that any constructional variants are considered to fall within the protective scope of the present technical solution, as claimed in the following.

The invention claimed is:

1. An interfolding machine for production of interfolded packs of sheet articles from strips comprising:

a first roller unit which comprises a cutting tool and a first roller, for guiding a strip, which bears the cutting tool;

a frame which comprises a seat which houses the first roller unit;

a main motor configured to rotate the first roller with respect to the frame about a rotation axis;

a first cutting tool;

a beam which bears the first cutting tool and which is fixed to the frame in a first position in which the first cutting tool has a relative first position with respect to the rotation axis so as to cut or score the strip with the cutting tool of the first roller unit;

wherein the first roller unit is interchangeable with another roller unit so as to vary the distance between the cuts or scores on the strip and therefore the length of the sheet articles, wherein the interfolding machine further comprises a second cutting tool, wherein the beam brings the second cutting tool into a different position with respect to the first cutting tool, and wherein the beam is fixable to the frame in a second position in which the second cutting tool has a relative second position with respect to the rotation axis, different from the relative first position, so as to cut or score the strip with the cutting tool of the other roller unit.

2. The interfolding machine according to claim 1, wherein the beam is rotatable with respect to the frame about an axis so that the first cutting tool and the second cutting tool are orientable with respect to the axis respectively as in the relative first position and as in the relative second position.

3. The interfolding machine according to claim 2, wherein:

the first cutting tool and the second cutting tool both comprise a blade, or counter-blade;

the beam comprises a first support part which houses the blade of the first cutting tool and a second support part which houses the blade of the second cutting tool;

the first support part and the second support part are configured so as to adapt the blades to the cutting tool respectively of the first roller unit or the other roller unit.

4. The interfolding machine according to claim 3, wherein the first support part has a first helical development and the second support part has a second helical development, and wherein the blade, or counter-blade, of the first cutting tool and the blade, or counter-blade, of the second cutting tool are identical to one another, and are fixed on the first support part and the second support part, respectively, so as to rest on and follow the first helical development and the second helical development, respectively.

5. The interfolding machine according to claim 2, wherein the beam is translatable with respect to the frame in moving towards or away from the rotation axis between a working position in which the first cutting tool cooperates with the cutting tool and a rest position in which the first cutting tool is by a side of the first roller so as to enable the change with the other roller unit.

6. The interfolding machine according to claim 1, wherein the beam comprises a central part, a first support which supports the first cutting tool and a second support which supports the second cutting tool and wherein the first support and the second support are removably fixed to the central part.

7. The interfolding machine according to claim 1, wherein the beam is translatable with respect to the frame in moving towards or away from the rotation axis between a working position in which the first cutting tool cooperates with the cutting tool and a rest position in which the first cutting tool is by a side of the first roller so as to enable the change with the other roller unit.

8. A system comprising an interfolding machine according to claim 1, and said another roller unit which comprises a dedicated cutting tool and another roller, for guiding a strip, which bears a dedicated cutting tool, wherein the first roller is configured to rotate about a first axis and brings the dedicated cutting tool to a first distance from the first axis and wherein the other roller is configured to rotate about a second axis and brings the dedicated cutting tool to a second distance from the second axis, different from the first distance.

9. The interfolding machine according to claim 2, wherein the beam comprises a central part, a first support which supports the first cutting tool and a second support which supports the second cutting tool and wherein the first support and the second support are removably fixed to the central part.

10. The interfolding machine according to claim 1, wherein:

the first cutting tool and the second cutting tool both comprise a blade, or counter-blade;

the beam comprises a first support part which houses the blade of the first cutting tool and a second support part which houses the blade of the second cutting tool;

the first support part and the second support part are configured so as to adapt the blades to the cutting tool respectively of the first roller unit or the other roller unit.

11. The interfolding machine according to claim 10, wherein the first support part has a first helical development and the second support part has a second helical development, and wherein the blade, or counter-blade, of the first cutting tool and the blade, or counter-blade, of the second cutting tool are identical to one another and are fixed on the first support part and the second support part, respectively, so as to rest on and follow the first helical development and the second helical development, respectively.

12. A method for varying the length of the sheet articles of the interfolded packs of sheet articles produced by an interfolding machine comprising steps of:

providing a system according to claim 8;

removing the beam from the first position;

removing the first roller unit from the seat;

positioning the other roller unit in the seat;

fixing the beam to the frame in the second position.

13. The method according to claim 12, wherein:

in the step of providing a system, a beam is provided which is rotatable with respect to the frame about an axis so that the first cutting tool and the second cutting tool are orientable with respect to the axis respectively as in the relative first position and as in the relative second position and which is translatable with respect to the frame in moving towards or away from the rotation axis between a working position in which the first cutting tool is in the relative first position and a rest position in which the first cutting tool is by a side of the first roller so as to enable the change with the other roller unit;

in the step of removing the beam from the first position, the beam is moved to the rest position;

the step of removing the first roller unit from the seat takes place after the beam is in the rest position.

14. The method according to claim 13, wherein:

in the step of fixing the beam to the frame in the second position, the beam is rotated about the axis to orient the second cutting tool with respect to the axis as in the relative second position.

* * * * *